(12) United States Patent
Bruce et al.

(10) Patent No.: US 11,692,662 B2
(45) Date of Patent: Jul. 4, 2023

(54) ELECTROFUSION FITTINGS FOR LINED PIPES

(71) Applicant: Subsea 7 Limited, Sutton (GB)

(72) Inventors: Christopher Bruce, Bathgate (GB); Chris Woods, Cowdenbeath (GB); Andrew Cupples, Dennyloanhead (GB); Ross McSkimming, Erskine (GB)

(73) Assignee: Subsea 7 Limited, Sutton (GB)

( * ) Notice: Subject to any disclaimer, the term of this patent is extended or adjusted under 35 U.S.C. 154(b) by 55 days.

(21) Appl. No.: 16/978,622

(22) PCT Filed: Mar. 5, 2019

(86) PCT No.: PCT/GB2019/050611
§ 371 (c)(1),
(2) Date: Sep. 4, 2020

(87) PCT Pub. No.: WO2019/171045
PCT Pub. Date: Sep. 12, 2019

(65) Prior Publication Data
US 2020/0408349 A1    Dec. 31, 2020

(30) Foreign Application Priority Data
Mar. 7, 2018 (GB) ...................... 1803673

(51) Int. Cl.
*F16L 58/18* (2006.01)
*B29C 65/34* (2006.01)
(Continued)

(52) U.S. Cl.
CPC ........ *F16L 58/181* (2013.01); *B29C 65/3468* (2013.01); *B29C 65/3476* (2013.01);
(Continued)

(58) Field of Classification Search
CPC ...... F16L 47/03; F16L 58/181; B29D 23/003; B29D 23/005; B29D 23/001; B29C 66/522; B29C 65/362
See application file for complete search history.

(56) References Cited

U.S. PATENT DOCUMENTS 3,943,334 A * 3/1976 Sturm ................... B29C 65/342
219/544
4,855,574 A 8/1989 Lodder et al.
(Continued)

FOREIGN PATENT DOCUMENTS

EP    0 221 396    5/1987
EP    0 366 299    5/1990
(Continued)

*Primary Examiner* — Daniel McNally
(74) *Attorney, Agent, or Firm* — Levy & Grandinetti

(57) ABSTRACT

A liner bridge for a lined pipeline has bores extending through a tubular wall and terminals fitted in the bores, each terminal being exposed to an inward side of the wall for conducting electricity to an electrofusion element. A sealing interface between each terminal and its surrounding bore has one or more projecting formations of the terminal and at least one complementary formation of the bore engaged with the or each of the projecting formations. The interface can also include a sealing mass in the bore.

24 Claims, 5 Drawing Sheets

(51) Int. Cl.
  *B29C 65/36* (2006.01)
  *B29C 65/00* (2006.01)
  *B29D 23/00* (2006.01)
  *F16L 13/02* (2006.01)
  *F16L 47/03* (2006.01)

(52) U.S. Cl.
  CPC ...... *B29C 65/3604* (2013.01); *B29C 66/5221* (2013.01); *B29C 66/612* (2013.01); *B29D 23/003* (2013.01); *F16L 13/0263* (2013.01); *F16L 47/03* (2013.01)

(56) References Cited

U.S. PATENT DOCUMENTS

| | | | |
|---|---|---|---|
| 5,697,143 A * | 12/1997 | Barfield | B29D 23/005 264/262 |
| 5,861,577 A * | 1/1999 | Tamura | F16L 5/10 174/50.56 |
| 5,990,462 A | 11/1999 | Scholl | |
| 8,398,119 B2 | 3/2013 | Kenworthy | |
| 8,942,552 B2 | 1/2015 | Pionetti et al. | |
| 2006/0202471 A1 * | 9/2006 | Weisbond | B29C 65/342 285/21.1 |
| 2011/0193339 A1 * | 8/2011 | Kenworthy | B29C 66/1286 285/21.2 |
| 2013/0114945 A1 * | 5/2013 | Pionetti | B29C 66/0224 392/472 |

FOREIGN PATENT DOCUMENTS

| | | |
|---|---|---|
| GB | 2 135 747 | 9/1984 |
| GB | 2516301 | 1/2015 |
| WO | WO 2006/096296 | 9/2006 |
| WO | WO 2010/041016 | 4/2010 |
| WO | WO 2012/017171 | 2/2012 |
| WO | WO 2013/136062 | 9/2013 |

* cited by examiner

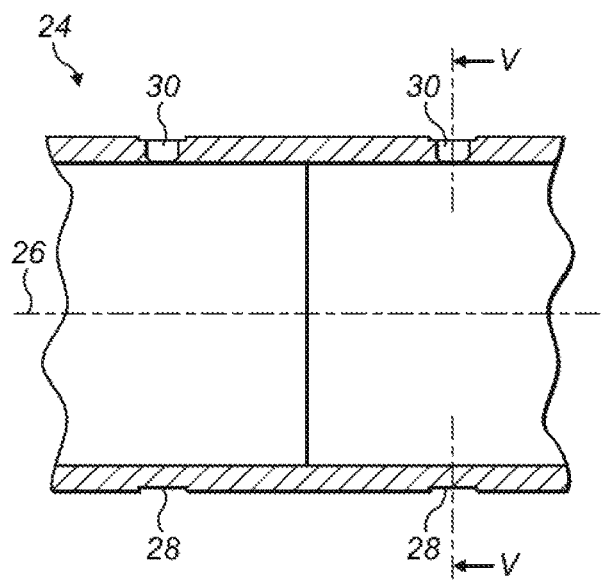
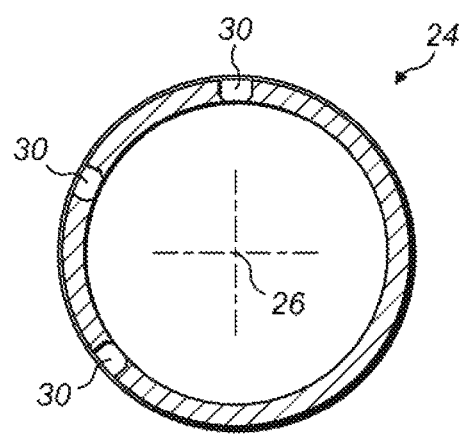
FIG. 4
FIG. 5
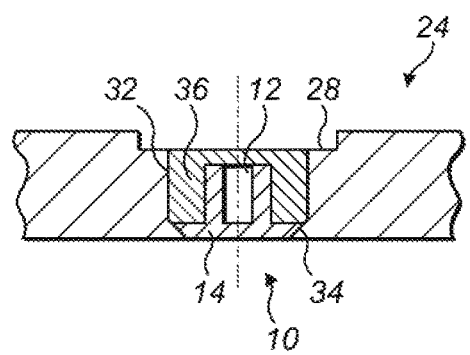
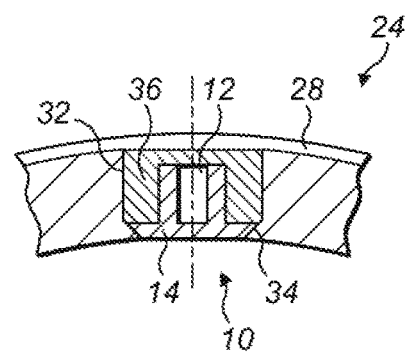
FIG. 6
FIG. 7

ELECTROFUSION FITTINGS FOR LINED PIPES

This invention relates to the use of electrofusion when joining together abutting sections of polymer-lined metal pipes, particularly when fusing a polymer liner bridge to respective parent liners of the pipes. More specifically, the invention relates to the problem of sealing activation terminals that are positioned inside the liner bridge to conduct the electric current required for electrofusion.

Corrosion protection is a key issue for pipelines used in the oil and gas industry, which are usually made of carbon steel to reduce their cost over often great lengths. Polymer liners are used to mitigate internal corrosion of such pipelines, as an alternative to more expensive liners of corrosion-resistant alloys. Polymer liners also aid thermal insulation of the pipeline, which may be particularly beneficial in subsea applications. Such liners may be of fibre-reinforced composites or solid plastics, for example high-density polyethylene (HDPE).

When fabricating a lined pipeline, it is necessary for lengths of lined steel pipe to be welded together while maintaining a continuous corrosion-resistant internal surface between them. In this respect, welding polymer-lined steel pipes is not straightforward because the liner may be damaged by the heat of welding. Additional bridging parts, namely liner bridges, are therefore required to ensure continuity between the parent liners of the pipes. A typical polymer liner bridge is disclosed in EP 0366299.

The interfaces between the parent liners and the liner bridge have to be sealed to close a potential leak path for the pressurised fluid that will be carried by the pipe in use. Sealing may be achieved mechanically, by bonding or by electrofusion. The present invention is concerned particularly with electrofusion, for which the prior art background will now be described.

As examples of background prior art, WO 2010/041016, WO 2012/017171 and GB 2516301 disclose electrofusion fittings that serve as liner bridges to connect parent liners before the surrounding metal pipes are welded together. In each case, the fitting is a sleeve of a thermoplastics material that includes heating coils around each end.

In use, the parent liners are machined back from the end of each pipe to create a socket or recess. The electrofusion fitting is inserted into the recess in the end of one pipe to abut its parent liner. Then, current is passed through the heating coils via electrical leads that extend through the fitting. This causes the thermoplastic materials of the fitting and the parent liner near the coils to melt and fuse together. The process is repeated to fuse the fitting to the parent liner of the other pipe, after which the metal pipes themselves are welded together around their circumferential interface.

The heating coils of the electrofusion fittings disclosed in WO 2010/041016, WO 2012/017171 and GB 2516301 are powered via electrical activation terminals exposed to the interior of the fitting. An internal reach rod mechanism is extended into contact with the terminals to supply electric current to them.

The activation terminals and their associated electrical leads may create a leak path between the bore of the lined pipe that conveys fluid in use and the outer side of an electrofusion fitting, where the heating coils are located. As a result, potentially corrosive fluid could migrate outwardly through the wall of the fitting to come into contact with the steel of the outer pipe, thus causing localised internal corrosion and producing regions of weakness in the pipe wall. This defeats the purpose of lining the pipe.

Other techniques have been developed to deliver electrical power to the heating coils of an electrofusion fitting to mitigate the risk that electrical leads could create a leak path through such a fitting. For example, electrical leads could extend outwardly through a gap between pipes held end-to-end. However, open-bevel weld preparation has fallen out of favour in modern subsea pipeline fabrication.

External energisation of an electrofusion fitting is not simple to achieve in the closed-bevel automatic pipeline welding techniques that are now prevalent in the industry. The need for internal activation terminals therefore remains, as does the challenge of ensuring leak-tightness.

More generally, electrical terminals for electrofusion coils are disclosed in prior art documents in other technical fields, such as the electrofusion couplings disclosed in U.S. Pat. No. 4,855,574, GB 2135747, U.S. Pat. No. 5,990,462 and WO 2006/096296 for fusing together polymer pipes inserted into opposite ends of the coupling. However, as the terminals and the coils are accessible from outside the coupling, no part of the electrofusion system will be in contact with the fluid carried by the conjoined pipes in use. Thus, they do not suggest any solution to mitigate a leak path in pipe liner bridges because the electrofusion system presents no risk of leakage through the wall of the coupling. In any event, any leakage would present no risk of corrosion because all of the pipe elements are of polymer materials.

Sealed electrical penetrators are also known, for example as disclosed in U.S. Pat. No. 5,861,577 where an elastic sealing mass aims for leak-tightness around a conductor extending through a bore in a metal partition member. However, such a solution may not work effectively where the bore extends through a wall of polymer material. This is because polymers are typically less rigid than metals and so may not provide a sufficient counter-reaction for proper sealing.

Against this background, the invention provides a liner bridge for a lined pipeline. The liner bridge comprises: a tubular wall; at least one bore extending through the wall from an inward side to an outward side; at least one electrofusion element; a terminal fitted in the or each bore and having a contact end exposed to the inward side of the wall for conducting electricity to the or each electrofusion element; and a sealing interface between the terminal and the surrounding bore. The sealing interface comprises at least one projecting formation of the terminal extending radially outwardly with respect to the bore and at least one complementary formation of the bore extending radially inwardly with respect to the bore, engaged with the or each projecting formation of the terminal.

Preferably, the or each projecting formation extends continuously and circumferentially around the terminal, and may be integral with the terminal. Similarly, the or each complementary formation preferably extends continuously and circumferentially around the bore, and may be integral with the wall defining the bore.

A contact end portion of the terminal may have a taper that narrows the terminal from a projecting formation toward the contact end; and the complementary formation of the bore may define a correspondingly-tapered seat. For example, the contact end portion of the terminal and the complementary formation of the bore may both be frusto-conical.

The terminal may have a castellated side profile that comprises at least two projecting formations spaced along the terminal and a recess defined between and separating those projecting formations. For example, the castellated side profile may be a sawtooth profile.

Advantageously, the bore may be expanded radially outwardly from an initial diameter by the presence of the terminal. In that case, the terminal may be wider at the recess than the initial diameter of the bore.

More generally, the terminal may be wider at the or each projecting formation than the initial diameter of the bore, at least where the bore will be opposed to that formation. In that case, elegantly, the or each complementary formation of the bore may be defined by radially-inward resilient relaxation of the radially-expanded bore around the or each projecting formation of the terminal. Thus, the tubular wall is suitably of resilient material that conforms to the or each projecting formation of the terminal.

In an embodiment of the invention, the terminal comprises a head that defines the contact end and the projecting formation, and a stem that extends along the bore and is narrower than the bore, hence defining an annular space between the stem and the bore. The annular space is apt to contain a sealing mass that bears against the head, the stem and the bore. More generally, the sealing interface may comprise a sealing mass placed or injected into the bore at an end of the terminal opposed to the contact end.

The sealing interface may also comprise adhesive disposed between the terminal and the bore, for example between the projecting formation of the terminal and the complementary formation of the bore.

The inventive concept also finds expression in a method of manufacturing a liner bridge for a lined pipeline. That method comprises: inserting a terminal into a bore that extends through a tubular wall of the liner bridge, leaving a contact end of the terminal exposed to the inward side of the wall for conducting electricity to at least one electrofusion element of the liner bridge; and forming a sealing interface by engaging at least one projecting formation of the terminal with at least one complementary formation of the bore.

Conveniently, the terminal may be inserted into the bore from an outward side of the wall. The bore may be expanded radially outwardly from an initial diameter by inserting the terminal into the bore. Then, at least one complementary formation may be formed by radially-inward resilient relaxation of the radially-expanded bore around the or each projecting formation of the terminal. However, the bore may still remain wider than the initial diameter at the complementary formation.

A tapered portion of the terminal may be seated into a correspondingly-tapered seat of the bore. Axial force may be applied to the terminal to press the tapered portion of the terminal into engagement with the seat. That axial force on the terminal may be maintained by engaging a projecting formation of the terminal with at least one complementary formation of the bore.

Adhesive may be applied to surfaces of the terminal and/or to the bore prior to inserting the terminal into the bore.

Embodiments of the invention provide a sealing interface for an electrical terminal arranged at least partially through a bore of a polymer liner, that interface comprising at least one radially-extending castellation formation around the terminal.

The sealing interface may also comprise at least one complementary protuberance inside the bore of the polymer liner, the diameter of the inner bore of the protuberance being smaller than the outer diameter of the castellation.

Alternatively, the inner wall of the bore of the polymer liner may be deformed during insertion of the electric terminal so that a complementary protuberance is formed in the polymer liner wall.

The castellation may be integral with the electrical terminal and the protuberance may be integral with the polymer liner.

The interface between the radially-innermost castellation and the corresponding protuberance may have a frusto-conical shape, whose smaller diameter is toward the radially-inner part of the polymer liner.

The sealing interface may also comprise an adhesive filler injected into a space within the bore of the polymer liner, for example between the electric terminal and the bore of the polymer liner.

The V-shaped, frusto-conical lower part of the terminal plug ensures sealing with the plastics liner wall. Sealing may be completed by adhesive and sealing filling and/or by additional castellations or rings encircling the terminal.

In summary, the invention provides a liner bridge for a lined pipeline. The liner bridge has bores extending through a tubular wall and terminals fitted in the bores, each terminal being exposed to an inward side of the wall for conducting electricity to an electrofusion element. A sealing interface between each terminal and its surrounding bore comprises one or more projecting formations of the terminal and at least one complementary formation of the bore engaged with the or each of the projecting formations. The interface may also include a sealing mass in the bore.

In order that the invention may be more readily understood, reference will now be made, by way of example, to the accompanying drawings in which:

FIG. 4 is a longitudinal sectional view of a liner bridge sleeve for an electrofusion fitting of the invention, with bores shaped to receive terminals as shown in FIG. 1;

FIG. 5 is a cross-sectional view of the liner bridge sleeve, taken on Section V-V of FIG. 4;

FIG. 6 is an enlarged detail view in longitudinal section of a terminal as shown in FIG. 1 received in a bore of the liner bridge sleeve as shown in FIG. 4;

Figure 8:
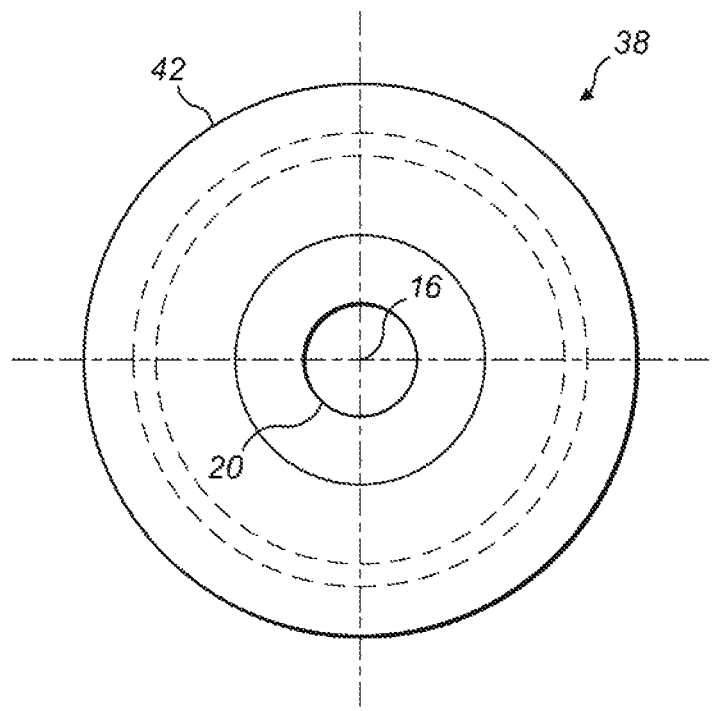
Figure 9:
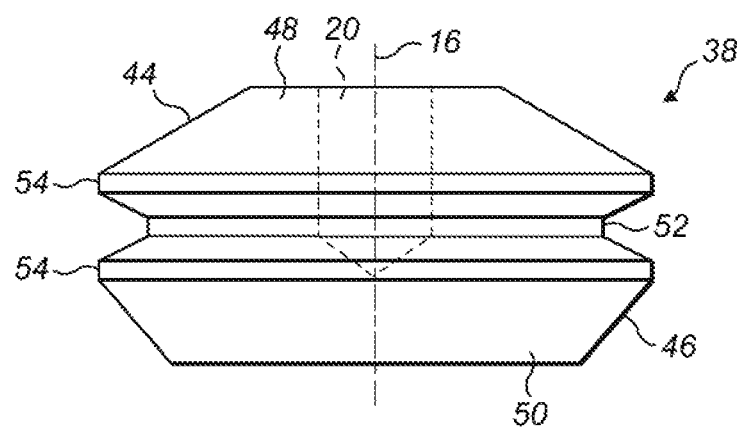
Figure 10:
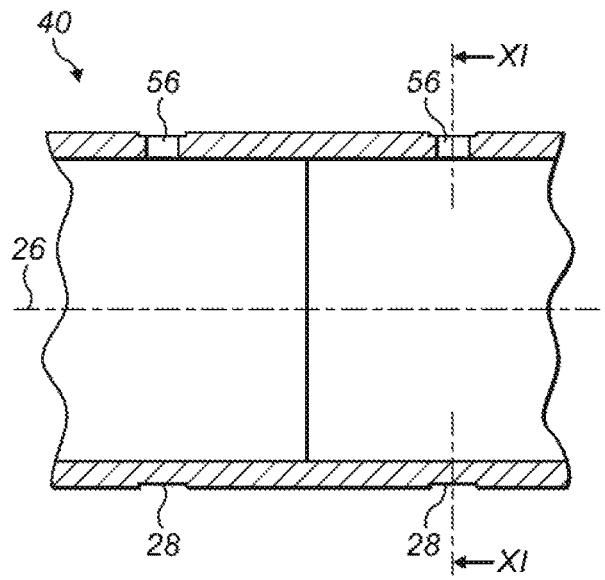
Figure 11:
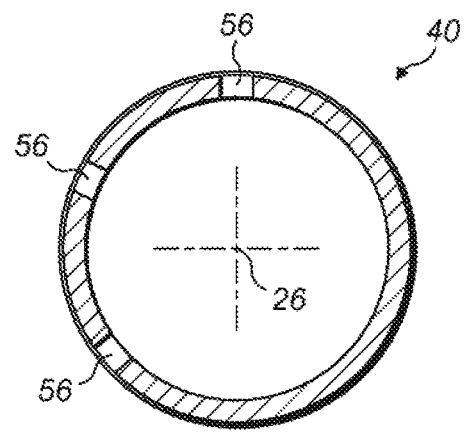
Figure 12:
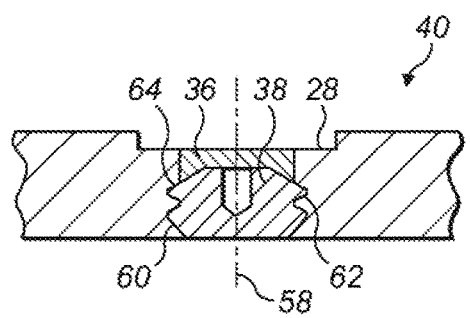
Figure 13:
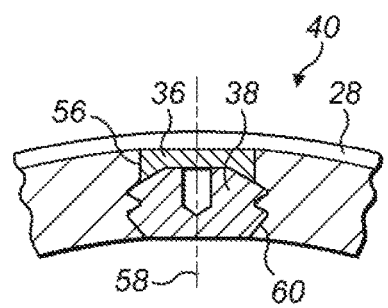
Figure 14:
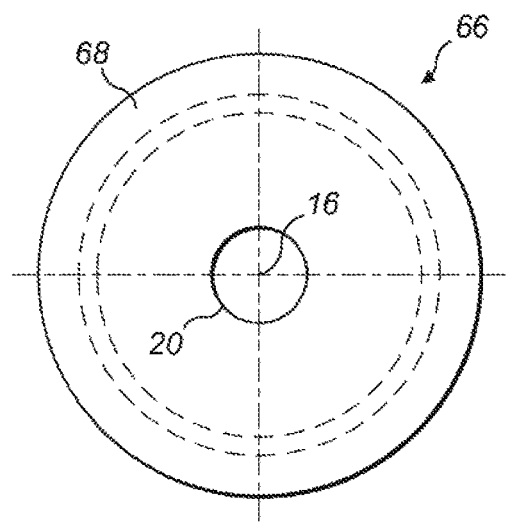
Figure 15:
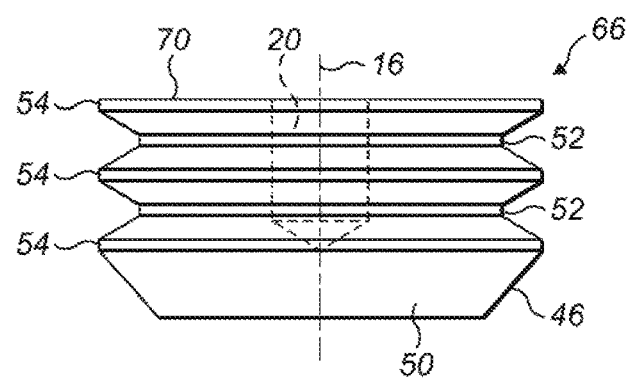
Figure 16:
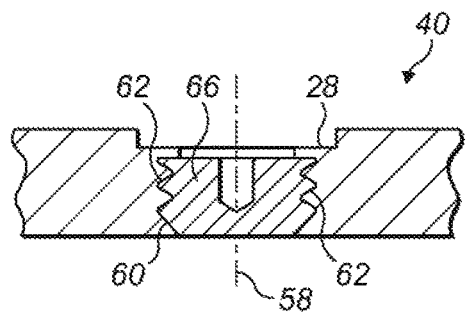
Figure 17:
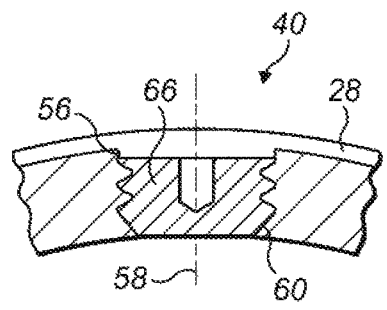

FIG. 7 corresponds to FIG. 6 but instead shows the detail view in transverse cross section;

FIG. 8 is a top plan view of a terminal in a second embodiment of the invention;

FIG. 9 is a side view of the terminal shown in FIG. 8;

FIG. 10 is a longitudinal sectional view of a liner bridge sleeve for an electrofusion fitting of the invention, with bores shaped to receive terminals as shown in FIG. 8;

FIG. 11 is a cross-sectional view of the liner bridge sleeve, taken on Section XI-XI of FIG. 10;

FIG. 12 is an enlarged detail view in longitudinal section of a terminal as shown in FIG. 8 received in a bore of the liner bridge sleeve as shown in FIG. 10;

FIG. 13 corresponds to FIG. 12 but instead shows the detail view in transverse cross section;

FIG. 14 is a top plan view of a terminal in a third embodiment of the invention;

FIG. 15 is a side view of the terminal shown in FIG. 15;

FIG. 16 is an enlarged detail view in longitudinal section of a terminal as shown in FIG. 14 received in a bore of the liner bridge sleeve as shown in FIG. 10; and FIG. 17 corresponds to FIG. 16 but instead shows the detail view in transverse cross section.

Figure 1:
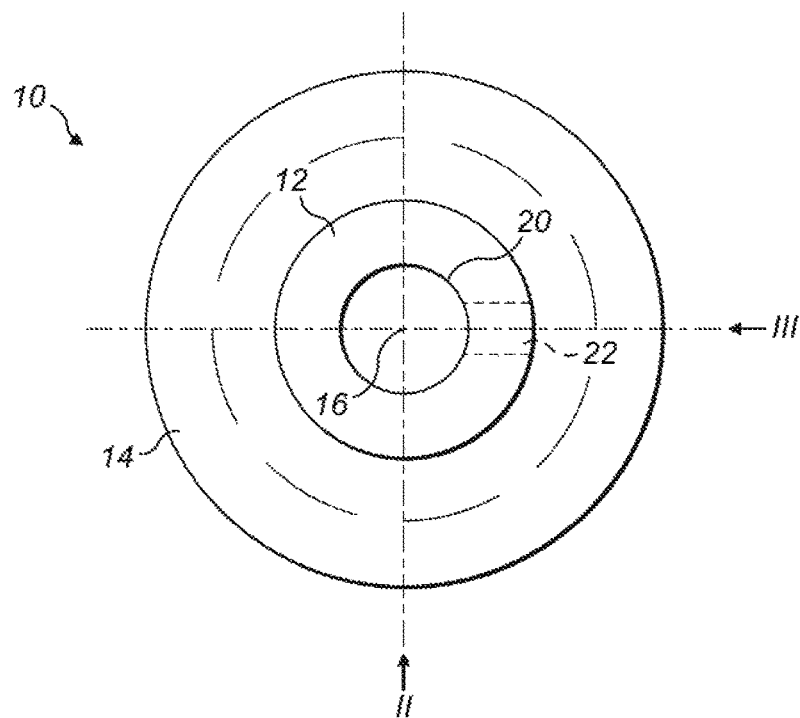
FIG. 1 is a top plan view of a terminal in a first embodiment of the invention.
Figures 2, 3:
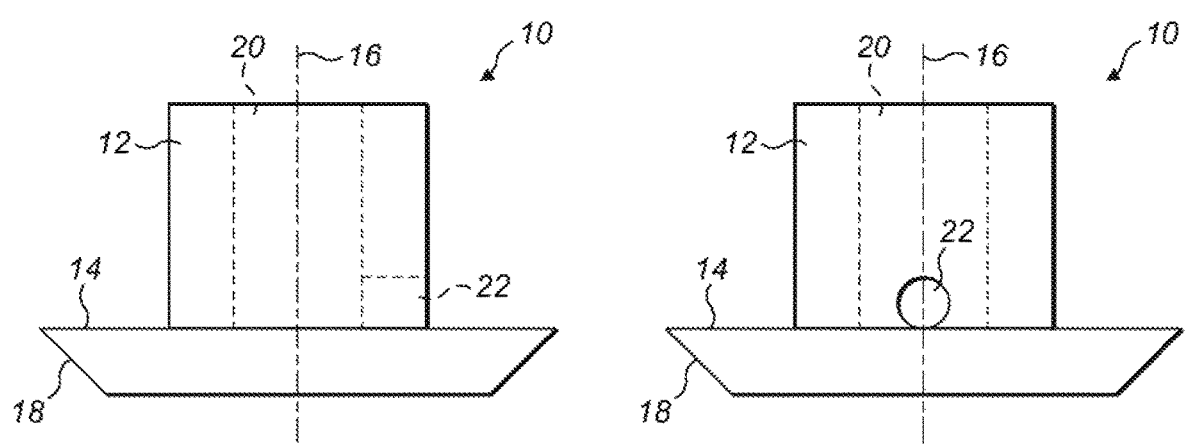
FIG. 2 is a side view of the terminal taken from Direction II in FIG. 1.
FIG. 3 is a side view of the terminal taken from Direction III in FIG. 1.

FIGS. 1 to 3 of the drawings show a plug-like terminal 10 in a first embodiment of the invention. The terminal 10 is of a conductive and corrosion-resistant metal, exemplified here by a copper-nickel alloy such as CuNi30Fe.

The terminal 10 comprises a tubular stem 12 and a radially-enlarged head 14 that is integral with, and closes one end of, the stem 12. In plan outline, the stem 12 and the head 14 are both rotationally symmetrical about a central longitudinal axis 16. In side view, the stem 12 and the head 14 together confer a T-shape on the terminal 10.

The head 14 is a generally flat disc that extends in a plane orthogonal to the central longitudinal axis 16. By virtue of its enlargement, the head 14 protrudes radially beyond the outer diameter of the stem 12 like a flange.

The head 14 has a chamfered radially-outer edge 18 that, in this example, is chamfered at about 45° to the central longitudinal axis 16. Thus, the head 14 has a shallow frusto-conical shape. By virtue of the chamfer, the head 14 tapers downwardly as illustrated, moving away from the open end of the stem 12.

A female-threaded blind hole 20 extends longitudinally and concentrically along the interior of the stem 12. A cross-bore 22 penetrates a wall of the stem 12 beside the head 12 and extends orthogonally relative to the central longitudinal axis 16 to intersect and communicate with the hole 20.

Turning next to FIGS. 4 and 5, these drawings show a simple tubular sleeve 24 for an electrofusion fitting that serves as a liner bridge of the invention.

The sleeve 24 is of a conventional thermoplastics material, for example polyethylene or polypropylene, curved around a central longitudinal axis 26. The sleeve 24 has a smooth radially-inner surface and longitudinally-spaced circumferential grooves 28 encircling its radially-outer surface.

In a complete liner bridge of the invention, the grooves 28 of the sleeve 24 may accommodate heating coils and associated wiring (not shown). To effect electrical connection from within the sleeve 24 to the wiring and heating coils on the outer side of the sleeve 24, the wall of the sleeve 24 is penetrated by bores 30 of circular cross-section whose central axes intersect the central longitudinal axis 26. The bores 30 are shaped and dimensioned to receive respective terminals 10 as shown in FIGS. 1 to 3.

The bores 30 are grouped to align axially with the grooves 28 and are distributed angularly around the central longitudinal axis 26. Each bore 30 is slightly narrower than the groove 28 with which it is aligned.

The angular and axial distribution of the bores 30 facilitates cooperation of an internal reach rod mechanism (not shown) that will be extended, in use, into physical and electrical contact with the heads 14 of the terminals 10. This enables the reach rod mechanism to supply electric current to the terminals 10 and hence to their associated wiring and heating coils.

With reference now also to FIGS. 6 and 7, each bore 30 has a major radially-outer portion 32 of constant cross-section, hence defining a cylindrical shape, and a minor radially-inner portion 34 of frusto-conical shape. The frusto-conical shape of the inner portion 34 tapers so as to narrow the bore 30 in a radially inward direction toward the radially-inner surface of the sleeve 24. This complements and is opposed to the corresponding shape of the chamfered edge 18 of the head 14.

Each terminal 10 is oriented such that its head 14 is radially inward and is inserted into its bore 30 from the radially outer side. Thus, when the terminal 10 is inserted fully into the bore 30 in a radially-inward direction, the head 14 of the terminal 10 seats into the outwardly-facing recess defined by the tapered inner portion 34 of the bore 30. This engagement between the head 14 and the inner portion 34 locates the terminal 10 in the bore 30, limits insertion of the terminal 10 into the bore 30 and helps to effect a seal between the head 14 and the surrounding polymer material of the sleeve 24.

When the terminal 10 is inserted fully into the bore 30, the head 14 lies exposed and substantially flush to the radially-inner surface of the sleeve 24. Conversely, the stem 12 of the terminal 10 lies radially outwardly of the head 14 within the bore 30. A bolt (not shown) can be inserted into and engaged with the female-threaded hole 20 within the stem 12 to fix wiring for connecting the terminal 10 to a heating coil.

As the width of the head 14 is slightly less than the width of the outer portion 32 of the bore 30, it will be apparent that the narrower stem 12 of the terminal 10 lies within, and spaced from, the surrounding cylindrical wall of the outer portion 32. This spacing defines an annular cavity around the stem 12 into which an adhesive sealing mass 36 is injected. The mass 36 bears against, seals against and adheres to the radially-outer side of the head 14, the outer side of the stem 12 and the inner wall of the bore 30 to locate and to seal the terminal 10 within the bore 30.

The aforementioned cross-bore 22 exhausts air into the hole 20 during injection of sealant into the annular cavity around the stem 12. Otherwise, trapped air could form a void at interfaces between the sealing mass 36 and the stem 12 or the head 14.

Moving on now to FIGS. 8 to 13, these drawings depict a second embodiment of the invention. Like numerals are used for like features.

FIGS. 8 and 9 show a terminal 38 of the second embodiment, which again is of a conductive and corrosion-resistant metal such as CuNi30Fe.

Like the terminal 10 of the first embodiment, the upper side of the terminal 38 as shown in FIGS. 8 and 9 will face radially outwardly and the lower side as shown will face radially inwardly when the terminal 38 is mounted to a sleeve 40 as shown in FIGS. 12 and 13. References in this description to upper and lower and to corresponding directions should be construed accordingly.

The terminal 38 comprises a shallow disc-shaped body 42 that is rotationally symmetrical about a central longitudinal axis 16. The body 42 has oppositely-chamfered upper and lower edges 44, 46 that, respectively, define oppositely-facing frusto-conical upper and lower sides 48, 50.

In this example, the chamfer of the lower edge 46 is inclined at about 40° to the central longitudinal axis 16 and the chamfer of the upper edge 44 has greater inclination with respect to the central longitudinal axis 16, being inclined here at about 60°.

By virtue of the chamfered lower edge 46, the lower side 50 of the body 42 tapers moving downwardly. However, chamfering of the upper edge 44 is optional; thus, the upper side 48 of the body 42 need not have a frusto-conical shape.

Between the chamfered upper and lower edges 44, 46, the body 42 is encircled by a groove 52 that gives the body 42 a narrow waisted shape. The groove 52 shown here has a symmetrical V-section.

In this example, the opposed sides of the groove 52 have opposite and equal chamfers each inclined at about 60° to the central longitudinal axis 16. Thus, the sides of the groove 52 define opposed frusto-conical portions of the body 42 that face toward each other about the groove 52, sandwiched between the frusto-conical upper and lower sides 48, 50 of the body 42 that face away from each other.

The chamfered sides of the groove 52 meet, respectively, with the chamfered upper and lower edges 44, 46 at respective side edges 54. Those side edges 54 extend circumferentially around the terminal 38 and lie in longitudinally-spaced parallel planes that are orthogonal to the central longitudinal axis 16. Thus, the side edges 54 define castellations that, in this example, confer a sharp-edged sawtooth profile on the side of the body 42 that extends parallel to the central longitudinal axis 16.

A female-threaded blind hole 20 centred on the central longitudinal axis 16 opens to the upper side 48 of the body 42 and extends longitudinally into the body 42 toward the lower side 50. As before, this hole 20 provides for electrical connection of the terminal 38 to wiring and a heating coil of the sleeve 40.

Referring now also to FIGS. 10 and 11, the sleeve 40 for use with the terminals 38 of the second embodiment substantially corresponds to the sleeve 24 for use with the terminals 10 of the first embodiment. Again, therefore, the sleeve 40 is a tube of thermoplastics material, curved around a central longitudinal axis 26, with longitudinally-spaced circumferential grooves 28 encircling its radially-outer surface.

Also as before, circular-section bores 56 penetrate the wall of the sleeve 40 with their central axes 58 intersecting the central longitudinal axis 26. The bores 56 are grouped to align axially with the grooves 28 and are distributed angularly around the central longitudinal axis 26 of the sleeve 40. Each bore 56 is slightly narrower than the groove 28 with which it is aligned.

In this instance, however, the bores 56 are shaped differently to the bores 30 of the sleeve 24. Here, each bore 56 is of constant cross-section, hence defining a cylindrical shape, throughout the thickness of the wall of the sleeve 40 from its radially-inner surface to the base of the associated groove 28.

The bores 56 are also dimensioned differently relative to the terminals 38, as will be apparent when considering FIGS. 12 and 13 which show a terminal 38 inserted into a bore 56. Here, it will be noted that the maximum diameter of the body 42 of the terminal 38, as defined by its pair of circumferential side edges 54, is substantially greater than the internal diameter of the bore 56. Consequently, the terminal 38 has to be force-fitted into the bore 56, preferably by being inserted into the bore 56 in a radially-inward direction with respect to the central longitudinal axis 26 of the sleeve 40.

Preferably, the diameter of the body 42 at the base of the groove 52 is also greater than the internal diameter of the bore 56 before the bore 56 is deformed upon inserting the terminal 38. However, to ease alignment with and insertion into the bore 56, the diameter of the body 42 at its lower extremity is slightly narrower than the initial diameter of the bore 56.

Force-fitting the terminal 38 causes the surrounding wall of the bore 56 to deform radially outwardly with respect to the central axis 58 of the bore 56. However, as the polymer material of the sleeve 40 is resilient, the wall of the bore 56 will relax and protrude radially inwardly with respect to the central axis 58 where the shape of the side profile of the body 42 so allows. This happens wherever the diameter of the body 42 is less than the maximum diameter defined by the side edges 54, particularly at the chamfered upper and lower edges 44, 46 of the frusto-conical upper and lower sides 48, 50, and in the groove 52 between the side edges 54.

In particular, the wall of the bore 56 opposed to the chamfered lower edge 46 of the body 42 forms a lower frusto-conical protrusion 60 at its radially-inner end where the bore 56 tapers in a radially-inward direction toward the central longitudinal axis 26 of the sleeve 40. This formation 60 corresponds to the pre-formed frusto-conical inner portion 34 of the bore 30 in the first embodiment, and similarly facilitates location of the terminal 38 and sealing around the terminal 38 within the bore 56.

The location and sealing effect is supplemented by a further circumferential protrusion 62 where the wall of the bore 56 bulges into the groove 52, and also where the wall of the bore 56 opposed to the chamfered upper edge 44 of the body 42 forms another frusto-conical protrusion 64 opposed to the lower protrusion 60.

It will therefore be apparent that when the terminal 38 is inserted into it, the wall of the bore 56 assumes a shape that emulates and complements the castellated saw-tooth side profile of the body 42. This effects mechanical engagement between the terminal 38 and the bore 56 that resists movement of the terminal 38 along the central axis 58 of the bore 56. It also facilitates sealing in two respects: firstly by virtue of the polymer material of the sleeve 40 bearing resiliently against the side of the terminal 38; and secondly by virtue of the labyrinthine, serpentine interface between the terminal 38 and the bore 56 which maximises the area of sealing contact between the sleeve 40 and the terminal 38.

It will also be apparent from FIGS. 12 and 13 that the overall thickness or axial length of the terminal 38 is less than the depth of the bore 56. Thus, when the terminal 38 has been forced to the radially-inner end of the bore 56 as shown, a cavity is left in the bore 56 on the radially-outer side of the terminal 38. An adhesive sealing mass 36 is injected into that cavity. The mass 36 bears against, seals against and adheres to the radially-outer side of the terminal 38 and the inner wall of the bore 56 to locate and to seal the terminal 38 within the bore 56. Hence, the second embodiment adopts a hybrid approach to sealing, in which sealing duties are shared between the castellated side profile of the terminal 38 and the adhesive mass 36 on the radially-outer side of the terminal 38.

Turning finally to FIGS. 14 to 17, these drawings depict a third embodiment of the invention. Again, like numerals are used for like features.

FIGS. 14 and 15 show a terminal 66 of the third embodiment, which again is of a conductive and corrosion-resistant metal such as CuNi30Fe. Again, the upper side of the terminal 66 as shown in FIGS. 14 and 15 will face radially outwardly and the lower side as shown will face radially inwardly when the terminal 66 is mounted to a sleeve 40 as shown in FIGS. 12 and 13. It will be noted in this respect that the same sleeve 40 as used with terminals 38 of the second embodiment can be used with terminals 66 of the third embodiment.

Broadly, the terminal 66 has a body 68 that corresponds to the body 42 of the terminal 38 except that the upper side 70 is no longer frusto-conical but is instead substantially flat. This provides space on the side of the body 68 for a pair of longitudinally-spaced parallel grooves 52 that are stacked one above the other, above the frusto-conical lower side 50 defined by the lower chamfered edge 46.

As a further side edge 54 is now defined between the adjacent grooves 52, there is now a total of three side edges 54. Beneficially, this adds further complexity of shape to, and extends the length of, the castellated sawtooth side profile of the body 68. As before, the side edges 54 extend circumferentially around the terminal 66 and lie in longitudinally-spaced parallel planes that are orthogonal to the central longitudinal axis 16 of the body 68.

When the terminal 66 is force-fitted into a bore 56 of a sleeve 40 as shown in FIGS. 16 and 17, the multiple castellations defined by the grooves 52 and side edges 54 create a corresponding array of circumferential formations 60, 62 that protrude inwardly from the wall of the bore 56. The engagement of those formations 60, 62 with the side of the body 68 improves location and sealing to such an extent that the injection of a sealing mass 36 is no longer necessary. However, as the terminal 66 need be no thicker than the terminal 38 of the second embodiment, this leaves space in the bore 56 for a cavity on the radially-outer side of the terminal 66 to receive an adhesive sealing mass 36 if additionally desired.

Some variants have been mentioned above. Other variants are possible within the inventive concept. For example, in the terminal of the first embodiment, the width of the head could be equal to or greater than the maximum width of the bore. This would make the head an interference fit or a force fit into the bore, potentially improving location and sealing.

In all embodiments, adhesive may be applied at points of direct engagement between the terminal and the cylindrical wall of the bore to enhance sealing and retention of the terminal. For example, in the third embodiment interfaces between the grooves 52 and side edges 54 of the terminal 66 and the circumferential formations 60, 62 of the bore 56 may be coated with adhesive. This may be achieved by spreading adhesive over surfaces of the terminal, the bore, or both, prior to insertion of the terminal into the bore. Various adhesives may be suitable for this purpose, for example cyanoacrylate glues.

In other variants, the or each circumferential groove extending around a terminal could have a shape other than a V-shape, such as a U-section, or could have substantially parallel sides. Also, the sectional shape of a groove could instead be asymmetric about a transverse plane that is orthogonal to the central longitudinal axis of the terminal.

More than two grooves and a correspondingly greater number of side edges may encircle a terminal.

The bore may be pre-fitted with one or more inwardly-facing protrusions rather than being smooth-surfaced or having one or more integral inwardly-facing protrusions, as in the illustrated embodiments.

The invention claimed is:

1. A liner bridge for a lined pipeline, the liner bridge comprising:
   a tubular wall;
   at least one bore extending through the wall from an inward side to an outward side;
   at least one electrofusion element;
   a terminal fitted in the or each bore and having a contact end exposed to the inward side of the wall for conducting electricity to the or each electrofusion element; and
   a sealing interface between the terminal and the surrounding bore;
   wherein the sealing interface comprises at least one projecting formation of the terminal extending radially outwardly with respect to the bore and at least one complementary formation of the bore extending radially inwardly with respect to the bore, engaged with the or each projecting formation of the terminal;
   and wherein the tubular wall is of resilient material that conforms to the or each projecting formation of the terminal.

2. The liner bridge of claim 1, wherein a castellated side profile of the terminal comprises at least two projecting formations spaced along the terminal and a recess defined between and separating those projecting formations.

3. The liner bridge of claim 2, wherein the castellated side profile is a sawtooth profile.

4. The liner bridge of claim 2, wherein the bore is expanded radially outwardly from an initial diameter by the presence of the terminal and the terminal is wider at the recess than the initial diameter of the bore.

5. The liner bridge of claim 1, wherein:
   a contact end portion of the terminal has a taper that narrows the terminal from a projecting formation toward the contact end; and
   the complementary formation of the bore defines a correspondingly-tapered seat.

6. The liner bridge of claim 5, wherein the contact end portion of the terminal and the complementary formation of the bore are frusto-conical.

7. The liner bridge of claim 1, wherein the bore is expanded radially outwardly from an initial diameter by the presence of the terminal and the terminal is wider at the or each projecting formation than the initial diameter of the bore.

8. The liner bridge of claim 7, wherein the or each complementary formation of the bore is defined by radially-inward resilient relaxation of the radially-expanded bore around the or each projecting formation of the terminal.

9. The liner bridge of claim 1, wherein the sealing interface comprises adhesive disposed between the terminal and the bore.

10. The liner bridge of claim 9, wherein the adhesive is disposed between the projecting formation of the terminal and the complementary formation of the bore.

11. The liner bridge of claim 1, wherein the or each projecting formation extends continuously and circumferentially around the terminal.

12. The liner bridge of claim 1, wherein the or each projecting formation is integral with the terminal.

13. The liner bridge of claim 1, wherein the or each complementary formation extends continuously and circumferentially around the bore.

14. The liner bridge of claim 1, wherein the or each complementary formation is integral with the wall defining the bore.

15. The liner bridge of claim 1, wherein the sealing interface comprises a sealing mass in the bore at an end of the terminal opposed to the contact end.

16. The liner bridge of claim 1, wherein the or each bore aligns with a circumferential groove extending around the outward side of the wall.

17. A method of manufacturing a liner bridge for a lined pipeline, the method comprising:
   inserting a terminal into a bore that extends through a tubular wall of the liner bridge, leaving a contact end of the terminal exposed to an inward side of the wall for conducting electricity to at least one electrofusion element of the liner bridge; and
   forming a sealing interface by engaging at least one projecting formation of the terminal extending radially outwardly with respect to the bore with at least one complementary formation of the bore extending radially inwardly with respect to the bore,
   wherein the tubular wall is of resilient material that conforms to the or each projecting formation of the terminal.

18. The method of claim 17, comprising expanding the bore radially outwardly from an initial diameter by inserting the terminal into the bore.

19. The method of claim 18, comprising forming at least one complementary formation by radially-inward resilient relaxation of the radially-expanded bore around the or each projecting formation of the terminal.

20. The method of claim 19, wherein the bore remains wider than the initial diameter at the complementary formation.

21. The method of claim 17, comprising inserting the terminal into the bore from an outward side of the wall.

22. The method of claim 17, wherein the or each complementary formation conforms resiliently to at least one projecting formation of the terminal.

23. The method of claim 17, further comprising placing a sealing mass into the bore to bear against the terminal and the bore.

24. The method of claim 17, comprising applying adhesive to the terminal and/or to the bore prior to inserting the terminal into the bore.

* * * * *